No. 755,794. PATENTED MAR. 29, 1904.
C. H. ROOT.
FENDER.
APPLICATION FILED AUG. 3, 1903.
NO MODEL.
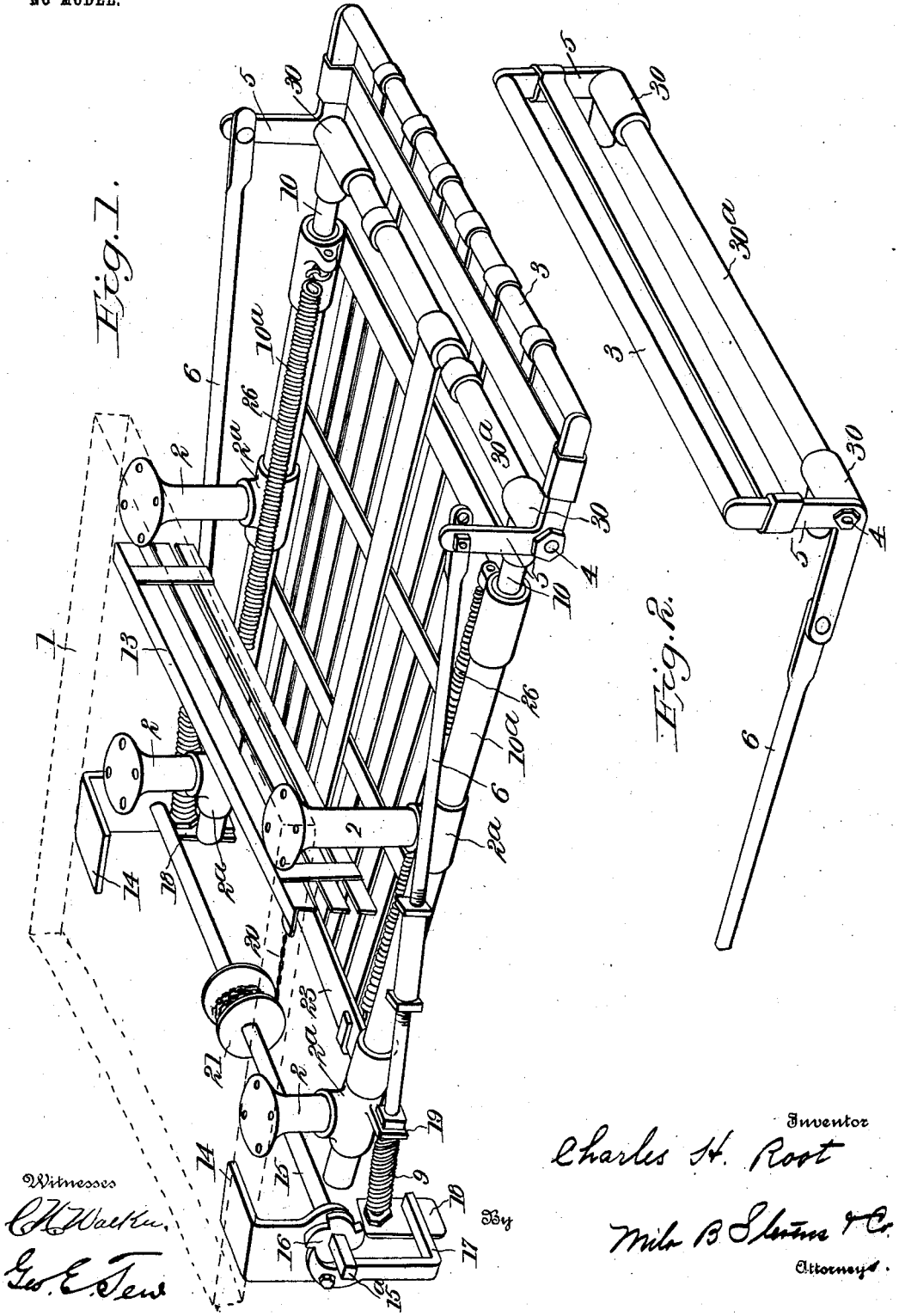

No. 755,794. Patented March 29, 1904.

UNITED STATES PATENT OFFICE.

CHARLES H. ROOT, OF CLEVELAND, OHIO.

FENDER.

SPECIFICATION forming part of Letters Patent No. 755,794, dated March 29, 1904.

Application filed August 3, 1903. Serial No. 168,034. (No model.)

*To all whom it may concern:*

Be it known that I, CHARLES H. ROOT, a citizen of the United States, residing at Cleveland, in the county of Cuyahoga and State of Ohio, have invented new and useful Improvements in Fenders, of which the following is a specification.

This invention relates particularly to wheel-fenders of that class wherein the fender upon being tripped shoots forward to receive the body or object struck; and the invention is particularly characterized by a fore tripping-fender which serves to trip the rear or main fender and also to turn up and back to prevent the body or object from rolling off the front of the main fender.

In the accompanying drawings, Figure 1 is a perspective view of the fender, the car-frame being indicated in dotted lines. Fig. 2 is a perspective view, partly broken away, showing the position of the fender after being tripped.

Referring specifically to the drawings, 1 indicates in outline the frame of the car, to which are fastened the standards 2, which support the fender. These standards carry in tubular rods $2^a$ the tubular side frames or guides $10^a$, which receive the cylindrical rods 10 of the main fender. Said rods telescope with the tubes $10^a$ and are connected by angle-pieces 30 with the front tube $30^a$ of the main fender. Springs 26 are connected to the forward end of the tubes $10^a$ and to the rear bar 23 of the main fender, and these springs tend to contract and shoot the main fender forward, which movement is guided by the rods 10 working in the tubes $10^a$.

Hinged to the front end of the main fender, as by a rod 4 extending through the tube $30^a$, is a tripping-fender 3, having crank-arms 5 at each end. Each of these arms is connected by a rod 6 to a plate 18, which lies behind the tail of a pawl 17. The rod 6 is guided and supported on a bracket 19, projecting from one of the standards 2, and is normally retained in proper position by a spring 9 bearing between the bracket 19 and the plate 18. This spring serves to counteract the weight of the tripping-fender 3 and to hold said fender so that it will not hit the ground. The pawl 17 acts to stop or release a ratchet-wheel 16, which is mounted upon a shaft 15, supported by brackets 14, attached to the car-frame. The shaft 15 carries a drum 21, having a chain 20 connected to the rear bar 23 of the main fender. The shaft is squared at the end, as at $15^a$, to receive a crank whereby it may be turned, by which means the chain may be wound up and the main fender retracted against the tension of the springs 26 and so held by engagement of the pawl 17 and ratchet 16.

In operation when the fore fender 3 strikes a body its first motion is down, which through the levers 5 pulls the rods 6 forward and disengages the pawls 17. The springs 26 then shoot the main fender forward, which has the effect of lifting the fore fender 3, as shown in Fig. 2. Thus a body falling on the fender when the main fender is shot forward is held thereon and prevented from rolling off by the fore fender. At 13 a barrier is indicated secured to the car-frame and occupying the space between the frame and the fender to prevent the body from rolling backward off of the fender.

What I claim as new, and desire to secure by Letters Patent, is—

1. The combination with a main rear sliding fender, and a spring to shoot the same forward, of a fore tripping-fender hinged at the front end of the main fender, a catch holding the main fender against movement, and connections, independent of the main fender, between the fore fender and the catch, acting when the fender is tripped to release the catch.

2. The combination with a main rear sliding fender, and a spring to shoot the same forward, of a tripping-fender hinged to the front of the main fender and having a projecting crank-arm, means including a catch to retract and hold the rear fender, and a rod connecting the catch and crank-arm, acting to release the catch when the fender is tripped.

3. The combination with a main rear sliding fender and a spring to shoot the same forward, of a fore tripping-fender hinged to the front of the rear fender and having a projecting crank-arm, a rod connected to the crank-arm, a catch connected to the rod and holding the main fender against movement, and a stop for the rod, supported on the car-frame, and acting to hold the rod and tilt up the fore fender when the rear fender shoots forward.

In testimony whereof I have signed my name to this specification in the presence of two subscribing witnesses.

CHARLES H. ROOT.

Witnesses:
JOHN A. BOMMHARDT,
LOTTIE NEWBURN.